March 8, 1966 H. MASHEDER 3,238,965
BALL VALVES
Filed Oct. 25, 1963

Inventor
Henry Masheder

By
Bailey, Stephens + Huettig
Attorneys 3,238,965
BALL VALVES
Henry Masheder, London, England, assignor to Lincoln Valves Limited, Kendal, Westmoreland, England, a British company
Filed Oct. 25, 1963, Ser. No. 319,015
9 Claims. (Cl. 137—329.05)

This invention is concerned with a valve of the type which is closed by means of a rotary member such as a ball engaging against the valve seating. Different surfaces of the rotary member may be presented against the seating on consecutive engagements of the rotary member with the seating. The wear on the rotary member is thus evenly distributed over its surface.

According to the invention, a valve comprises a valve seating, a rotary member having a curved surface, means for moving the rotary member bodily towards or away from a position at which a part of the curved surface engages with the valve seating in order to close the valve, the movement being in a direction inclined to the direction of flow through the valve, and a surface against which the curved surface of the rotary member frictionally engages during the movement of the rotary member towards or away from the valve seating, so that a rolling motion is imparted to the rotary member during such movement.

In the preferred arrangement, the rotary member is a ball, which is held within an open socket in the end of a generally cylindrical valve head. This head is on the end of a stem which is connected to the valve control system. The valve head may slide within a cylinder in the valve casing, and during such sliding movement the ball rolls upon a surface which is part of the surface of the cylinder in the valve casing, and which is also an extension of the surface of the valve seating. The surface of the valve seating against which the ball engages is conical.

In an alternative arrangement, the rotary member is a cylindrical roller, which is arranged to engage against a generally rectangular valve seating.

A preferred construction of valve according to the invention will now be described with reference to the accompanying drawings, in which.

Figure 1:
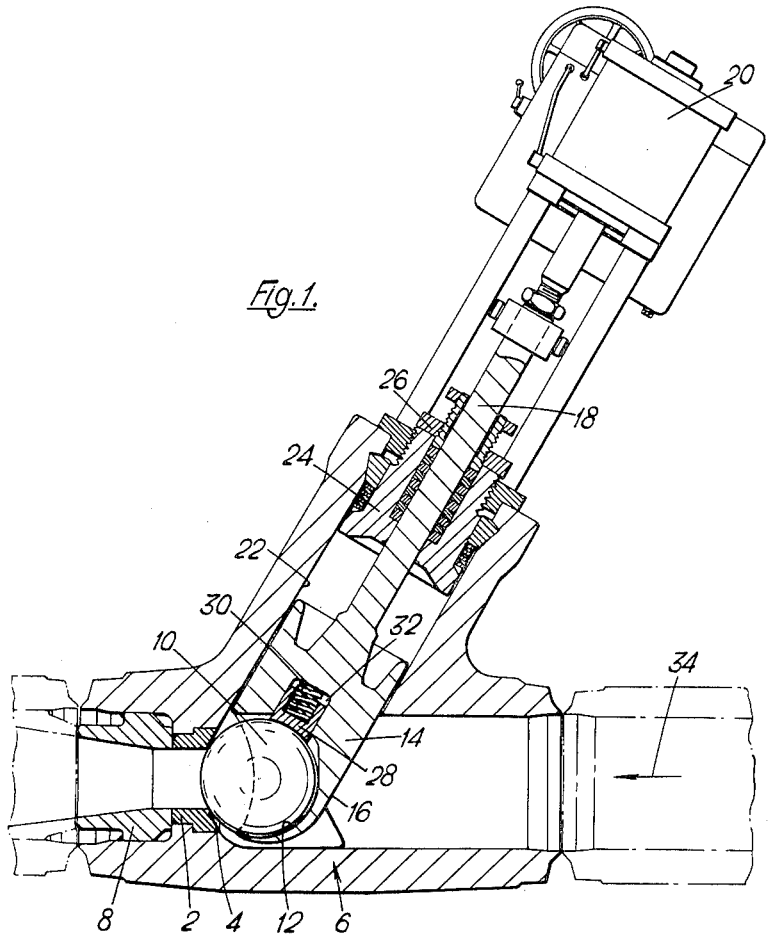
FIGURE 1 shows a sectional side elevational view of a valve.

In FIGURE 1, a valve seating 2 having a conical surface 4 is fitted into a valve casing 6 adjacent to a liner 8. The rotary member of the valve is a ball 10 which sits within an open socket 12 in the end of a valve head 14 having a cylindrical surface 16. The valve head 14 is integral with a stem 18, which is connected to a piston moving within a hydraulic servo-cylinder 20.

The cylindrical surface 16 of the valve head 14 moves within a cylinder 22, formed within the valve casing 6. The axis of the cylinder 22 is inclined to the direction of flow through the valve at the same angle as the conical surface 4 of the valve seating 2, so that a part of the surface of the cylinder 22 extends continuously from part of the conical surface 4.

The diameter of the port through the valve seating 2 and the angle of inclination of the conical surface 4 of the valve seating 2 to the direction of flow through the valve are preferably such that the surface 4 is tangential to the surface of the ball 10 when it is engaged against the seating 2. In the valve shown, this angle of the conical surface 4 and the angle of inclination of the axis of the cylinder 22 are both 60°.

The inclination of the direction of movement of the ball to the direction of flow through the valve results in the fact that the force required to withdraw the ball from its seating is considerably less than the force acting upon the ball by virtue of the fluid pressure of the fluid prevented from flowing by means of the valve. For an angle of inclination of 60°, the force required to withdraw the ball away from the seating is half the force acting upon the ball by virtue of the fluid pressure.

The stem 18 slides within a pressure bonnet 24 which is sealed by a safety gland head 26.

A plunger 28 is biased against the surface of the ball 10 by means of a spring 30, which bears against the bottom of a cylindrical socket 32 in the valve head 14.

When the valve is open, fluid flows through the valve from right to left as indicated by the arrow 34. If the valve head 14 is moved from its open position to the position at which the ball 10 engages against the conical surface 4 of the seating 2 in order to close the valve, the ball 10 frictionally engages against the cylindrical surface 22, and thus rolls along this surface. There may be some slipping, so that a different part of the spherical surface of the ball may be presented against the valve seating 2 in successive engagements of the ball with this seating. When the ball 10 engages against the valve seating 2, the surface of the socket 12 bears against the opposite side of the ball 10 in order to press it firmly against the seating 2. Continuous pressure may be thus exerted against the ball, this pressure being transmitted by means of the stem 18 and valve head 14.

In a modified construction, a ball rotates about a pin on the end of a forked arm. The pin may pass freely through a hole through the ball.

As a further optional modification, a dash pot arrangement may be used to ensure a constant, shock-free closing of the valve. As the ball is moved towards the valve seating, a piston is moved within a cylinder filled with a suitable fluid such as oil.

A valve according to the invention may be used as a non-return valve, or as a form of safety valve. The ball is arranged to be free to rise up the cylinder in the valve casing, against gravity or against a spring. Fluid pressure acting to force the ball away from the seating will thus cause the ball to rise up the cylinder. If there is no spring, the angle of inclination of the axis of the cylinder to the direction of flow will determine the return force of the ball towards the seating due to gravity. The means for moving the rotary member towards or away from a position at which a part of the curved surface engages with the valve seating, which is a feature of the present invention, is thus the cylindrical surface of the valve head moving within the cylinder formed within the valve casing, in combination with the force due to gravity.

Figure 2:
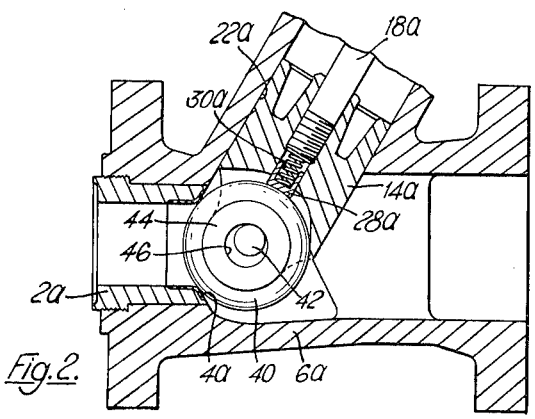
FIGURE 2 shows a sectional side elevation of part of a modified construction of valve.

FIGURE 2 shows a modified construction, in which a roller is used instead of a ball. The arrangement is otherwise similar to that shown in FIGURE 1. Similar parts are therefore identified by the same reference numerals, but with the addition of the suffix *a*.

Instead of the ball 10 in FIGURE 1, a roller 40 is mounted upon a pin 42 extending across the arms 44 of a fork on the end of the valve head 14a. The diameter of the pin 42 is less than the diameter of a bore 46 extending through the roller. A plunger 28a is biased against the surface of the roller 40 by means of a spring 30a. To close the valve the roller is moved by means of a valve head 14a sliding within the cyliner 22a to a position in which its surface engages against the surface 4a of the valve seating 2a; the valve seating 2a is rectangular in cross-section.

To open the valve, the valve head 14a is moved so that the roller 40 rolls up the side surface of the cylinder 22a. The looseness of the mounting of the roller 40 on the pin 42 ensures that different parts of the surface of the roller 40 engage with the valve seating each time the valve is closed.

I claim:

1. A valve comprising a casing, a valve seating in said casing, a valve head having an open socket in its end portion, a rotary member having a curved surface, resilient means for positively holding said member within said open socket in the valve head, means for moving the valve head and the rotary member bodily in a direction inclined to the direction of flow through the valve towards or away from a position at which a part of the curved surface of the rotary member engages with the valve seating in order to close the valve, and a surface in said casing against which the curved surface of the rotary member frictionally engages during the movement of the rotary member towards or away from the valve seating, such that a rolling motion is imparted to the rotary member during such movement.

2. A valve as in claim 1 in which said resilient means comprises a spring biased against an interior surface of the open socket in the valve head.

3. A valve as in claim 2, further comprising a plunger bearing against the surface of the rotary member and engaged by said spring.

4. A valve as in claim 3 in which said surface in said casing against which the curved surface of the rotary member frictionally engages comprises the interior surface of a cylinder within which the valve head slides during its movement towards or away from the valve seating.

5. A valve as in claim 4 in which said rotary member comprises a roller mounted within the open socket in the valve head for rotation about a spindle which passes freely through a bore through the roller, and said resilient means comprising a spring biasing said roller so that is is held positively within the open socket with the surface of the bore bearing against the spindle.

6. A valve comprising a casing, a valve seating in said casing having a conical surface, a valve head having an open socket in its end portion, a rotary member held within said open socket, means for moving said valve head with said rotary member bodily in a direction which is inclined to the direction of flow through the valve at the same angle as the conical surface of the valve seating, towards or away from a position at which a part of the curved surface of said rotary member engages with said conical surface of the valve seating in order to close the valve, and a surface in said casing against which the curved surface of the rotary member frictionally engages during the movement of the rotary member towards or away from the valve seating, such that a rolling motion is imparted to the rotary member during such movement.

7. A valve as in claim 6, further comprising resilient means for holding said rotary member positively and resiliently within said open socket.

8. A valve as in claim 7 in which said resilient means comprises a spring biased against an interior surface of the open socket in the valve head.

9. A valve as in claim 8, further comprising a plunger bearing against the surface of the rotary member and engaged by said spring.

References Cited by the Examiner

UNITED STATES PATENTS

| | | | |
|---|---|---|---|
| 2,693,199 | 11/1954 | Sims | 251—88 X |
| 2,841,167 | 7/1958 | Jacobson | 251—86 X |

FOREIGN PATENTS

| | | |
|---|---|---|
| 552,126 | 1/1958 | Canada. |

ISADOR WEIL, *Primary Examiner.*